(12) United States Patent
Harper et al.

(10) Patent No.: US 11,566,703 B2
(45) Date of Patent: Jan. 31, 2023

(54) METHOD SYSTEM FOR CONTROL OF GEAR SELECTION IN VEHICLES

(71) Applicant: Caterpillar Inc., Peoria, IL (US)

(72) Inventors: Robert Nicholas Harper, Melbourne (GB); Christopher L. Wynkoop, Eureka, IL (US); Shanmugahari Murugesan, Chennai (IN)

(73) Assignee: Caterpillar Inc., Peoria, IL (US)

( * ) Notice: Subject to any disclaimer, the term of this patent is extended or adjusted under 35 U.S.C. 154(b) by 52 days.

(21) Appl. No.: 17/181,521

(22) Filed: Feb. 22, 2021

(65) Prior Publication Data
US 2021/0262565 A1  Aug. 26, 2021

(30) Foreign Application Priority Data
Feb. 26, 2020  (IN) .............................. 202011008117

(51) Int. Cl.
*F16H 59/40* (2006.01)
*F16H 61/02* (2006.01)
*F16H 59/36* (2006.01)

(52) U.S. Cl.
CPC ......... *F16H 61/0213* (2013.01); *F16H 59/40* (2013.01); *F16H 61/0246* (2013.01); *F16H 2059/366* (2013.01)

(58) Field of Classification Search
CPC ............... F16H 59/40; F16H 2059/366; F16H 61/0213; F16H 61/0246; F16H 2061/0485; F16H 2061/0488; F16H 2061/165; F16H 2312/09
See application file for complete search history.

(56) References Cited

U.S. PATENT DOCUMENTS

| | | | |
|---|---|---|---|
| 4,897,790 A * | 1/1990 | Bieber | F16H 61/0213 477/131 |
| 5,587,905 A | 12/1996 | Yesel et al. | |
| 6,579,208 B2 | 6/2003 | Oliveira et al. | |
| 7,556,585 B2 | 7/2009 | Landes | |
| 9,545,925 B1 * | 1/2017 | Guldan | B60W 10/02 |

(Continued)

FOREIGN PATENT DOCUMENTS

GB  2576746 A  3/2020

OTHER PUBLICATIONS

Great Britain Search Report related to GB Application No. GB2005270.0; dated Oct. 19, 2020.

*Primary Examiner* — Edwin A Young

(57) ABSTRACT

A method of controlling gear selection in a vehicle transmission comprises detecting a change in a direction control signal (DCS) from a neutral signal state. If the current TOS is less than or equal to a predetermined neutral shift threshold TOS, the transmission selects one of a plurality of first direction gears if the DCS was changed to a first direction signal state or one of a plurality of second direction gears if the DCS was changed to a second direction signal state. If the current TOS is greater than the predetermined neutral shift threshold TOS, the transmission selects one of the plurality of first direction gears if a machine motion direction parameter indicates that the vehicle is moving in the first direction or one of the plurality of second direction gears if the machine motion direction parameter indicates that the vehicle is moving in the second direction.

17 Claims, 10 Drawing Sheets

(56) References Cited

U.S. PATENT DOCUMENTS

| | | | |
|---|---|---|---|
| 9,689,490 B2* | 6/2017 | Patenaude | F16H 61/0213 |
| 2007/0293367 A1 | 12/2007 | Trevino et al. | |
| 2013/0053216 A1* | 2/2013 | Schneider | F16H 61/0246 |
| | | | 477/115 |
| 2016/0348785 A1 | 12/2016 | Patenaude et al. | |

* cited by examiner

| Initial gear when direction shift is requested | Transmission output speed when direction shift is requested | Shift control logic shift |
|---|---|---|
| Forward to reverse | | |
| 3F | ≤1000<br>(Threshold to allow the direction shift) | 3F-3R |
| 3F | 1010 (greater than 1000)<br>Once TOS ≤1000 | 3F-2F<br>2F-2R |
| 2F | ≤1000 | 2F-2R |
| 2F | 1010<br>Once TOS ≤1000 | 2F<br>2F-2R |
| 4F | ≤1000 | 4F-3R |
| 4F | 1010<br>Once TOS ≤1000 | 4F-3R-2F<br>2F-2R |
| Reverse to forward | | |
| 3R | ≤1000<br>(Threshold to allow the direction shift) | 3R-3F |
| 3R | 1010<br>Once TOS ≤1000 | 3R-2R<br>2R-2F |
| 2R | ≤1000 | 2R-2F |
| 2R | 1010<br>Once TOS ≤1000 | 2R<br>2R-2F |

FIG. 10

METHOD SYSTEM FOR CONTROL OF GEAR SELECTION IN VEHICLES

CROSS REFERENCE TO RELATED APPLICATION

This application claims priority under 35 USC § 119 and the Paris Convention to Inidan Patent Application No, 202011008117 filed on Feb. 26, 2020.

TECHNICAL FIELD

The present disclosure relates to a method of controlling gear selection in a transmission of a vehicle in response to a request by an operator to shift the vehicle transmission out of neutral and to a control system for controlling gear selection when shifting out of neutral in vehicles.

BACKGROUND

Many vehicles, such as work machines, mining equipment and other work vehicles may include a powershift transmission coupled to a power source, such as an internal combustion engine or an electric motor, in order to provide more flexible use of the power output of the power source. The transmission for such a vehicle typically comprises a plurality of speed and direction changing clutches, and a plurality of transmission gears, wherein combinations of pairs of direction and speed changing clutches effectively recruit transmission gears to provide a plurality of transmission gear ratios. The transmission may provide not only a number of gears having gear ratios that enable the work machine to travel at a relatively wide range of speeds or conditions that might be impractical without a transmission, but also for a change of vehicle direction between forward and reverse. Some transmissions are configured to change gears automatically in order to improve ease of operation of the vehicle through its speed range.

The direction of vehicle travel may be selectable by an operator via a suitable control device, such as a joystick. Operator selected direction shifts, to change the direction of travel while the vehicle is moving, are common especially with vehicles such as backhoe loaders and forklifts. Operators may also select a control setting for putting the transmission in neutral during operation of the vehicle. This may occur, for example, during transition of the control device from a forward position to a reverse position of the control device through a neutral position of the control device. Alternatively, an additional neutralizer control may be provided which overrides the position of the control device to put the transmission in neutral. With the transmission in neutral, the vehicle may speed up or slow down, for example when coasting downhill.

When requesting a shift out of neutral, the Operator may request a direction matching or opposite to the current direction of motion of the machine. During a transmission shift, energy is transmitted to the clutch plates and the amount of energy is proportional to the speed differential of the clutch plates. In a high speed direction shift, the clutch plates are rotating in opposite directions with a high speed differential before engagement. Therefore, in the time it takes for the clutch to fully lock up, a large amount of energy may be transmitted to the clutch plates, being converted from kinetic energy to heat energy due to friction. The increased energy requirement may cause increases in the heat generated at the transmission clutches during the velocity change, and can result in premature clutch failure when the clutch temperature repeatedly exceeds the material durability limits of the clutch components. Similar issues can arise when the vehicle accelerates or decelerates while in neutral and then a forward or reverse gear is engaged. Similar issues can also arise when the vehicle accelerates and clutches cause the vehicle to upshift and when the vehicle decelerates and clutches maintain the current gear or downshift for engine braking. In some powershift transmissions, the incoming direction changing clutch is often most prone to damage as much of the energy of the vehicle is effectively absorbed by the direction changing clutch.

There may also be a risk of over speeding of a power unit of the vehicle when engaging a gear on shifting out of neutral if the vehicle speed has increased while in neutral.

One option to mitigate this behaviour is to raise a warning, but this may still allow the potential damage to occur. Another option when a high speed direction shift is requested is to inhibit a direction shift. Inhibiting a shift includes holding the original gear but limiting engine speed to slow the machine or selecting neutral to slow the vehicle. Inhibiting a shift may be problematic as the vehicle's behaviour may not be as the operator expects. Where the operator expects a rapid deceleration, if only a moderate or no deceleration is realised, this may lead to degradation of control or the need to employ inconvenient stopping mechanisms, such as dropping work tools or employing the parking brake. Inhibiting a shift out of neutral may be disadvantageous as it could lead to coasting, and unwanted increases in speed. Inhibiting a shift may include holding the original gear or selecting neutral.

U.S. Pat. No. 9,689,490B2 describes a method for velocity change gear selection and shift execution for a motor grader, including a method for controlling directional shift gear selection. When the rotational speed of the transmission output shaft is greater than a predetermined limit, the transmission is prevented from shifting directly to a reverse gear. Instead, the transmission initially downshifts to a lower forward gear (e.g. from 4F to 3F) and a retarding force is applied to slow the work machine until the rotational speed of the transmission output shaft is less than the predetermined maximum velocity limit. When the speed is less than the predetermined limit, the directional shift is completed by shifting the transmission to a lower reverse gear (e.g. from 3F to 1R). This is a combinational direction shift, i.e. there is a direction and gear number change. In some cases the direction shift is prohibited until the operator slows the machine to below the predetermined speed.

There is a need for a control strategy to select an appropriate gear when shifting out of neutral and hence prevent the transmission damage whilst maintaining vehicle control.

SUMMARY

The present disclosure therefore provides a method of controlling gear selection in a transmission of a vehicle, said vehicle having a power unit and an automatic transmission, said transmission having a plurality of first direction gears configured to move the vehicle in a first direction and a plurality of second direction gears configured to move the vehicle in a second direction which is opposite to the first direction;

wherein a direction control signal is received from one or more input devices controlled by an operator of the vehicle; and a machine motion direction parameter is determined by a control system of the vehicle;

the method comprising the steps of:

i) detecting a change in the direction control signal from a neutral signal state to a first direction signal state or a second direction signal state;
ii) determining a current transmission output speed;
iii) comparing the current transmission output speed with a predetermined neutral shift threshold transmission output speed; and either
iv a) if the current transmission output speed is less than or equal to the predetermined neutral shift threshold transmission output speed, causing the transmission to select a gear from the plurality of first direction gears if the direction control signal was changed to the first direction signal state or to select a gear from the plurality of second direction gears if the direction control signal was changed to the second direction signal state; or
iv b) if the current transmission output speed is greater than the predetermined neutral shift threshold transmission output speed, causing the transmission to select a gear from the plurality of first direction gears if the machine motion direction parameter indicates that the vehicle is moving in the first direction or to select a gear from the plurality of second direction gears if the machine motion direction parameter indicates that the vehicle is moving in the second direction.

The present disclosure also provides a control system for controlling gear selection in a transmission of a vehicle, said vehicle having a power unit and an indirect drive automatic transmission, said transmission having a plurality of first direction gears configured to move the vehicle in a first direction and a plurality of second direction gears configured to move the vehicle in a second direction which is opposite to the first direction, said control system configured to;
evaluate a direction control signal from one or more input devices controlled by an operator of the vehicle; and
determine a machine motion direction parameter;
i) said control system being further configured to detect a change in the direction control signal from a neutral signal state to a first direction signal state or a second direction signal state;
ii) determine a current transmission output speed;
iii) compare the current transmission output speed with a predetermined neutral shift threshold transmission output speed; and either
iv a) if the current transmission output speed is less than or equal to the predetermined neutral shift threshold transmission output speed, cause the transmission to select a gear from the plurality of first direction gears if the direction control signal was changed to the first direction signal state or to select a gear from the plurality of second direction gears if the direction control signal was changed to the second direction signal state; or
iv b) if the current transmission output speed is greater than the predetermined neutral shift threshold transmission output speed, cause the transmission to select a gear from the plurality of first direction gears if the machine motion direction parameter indicates that the vehicle is moving in the first direction or to select a gear from the plurality of second direction gears if the machine motion direction parameter indicates that the vehicle is moving in the second direction.

The present disclosure also provides vehicle comprising:
a power unit;
an indirect drive automatic transmission, said transmission having a plurality of first direction gears configured to move the vehicle in a first direction and a plurality of second direction gears configured to move the vehicle in a second direction which is opposite to the first direction;
an operator actuated input direction control configured to generate direction control signals;
at least one transmission output speed sensor configured to measure current speed of the transmission output and generate a transmission output speed signal; and
the control system according to the present disclosure operatively connected to the power unit, transmission, input direction control, and at least one transmission output speed sensor.

BRIEF DESCRIPTION OF THE DRAWINGS

Aspects of the present disclosure are described below, by way of example only, with reference to the following drawings, in which:
FIG. 10 is a table of data for an exemplary directional shifting control logic implemented by the transmission control system of FIG. 2.

DETAILED DESCRIPTION

Figure 1:
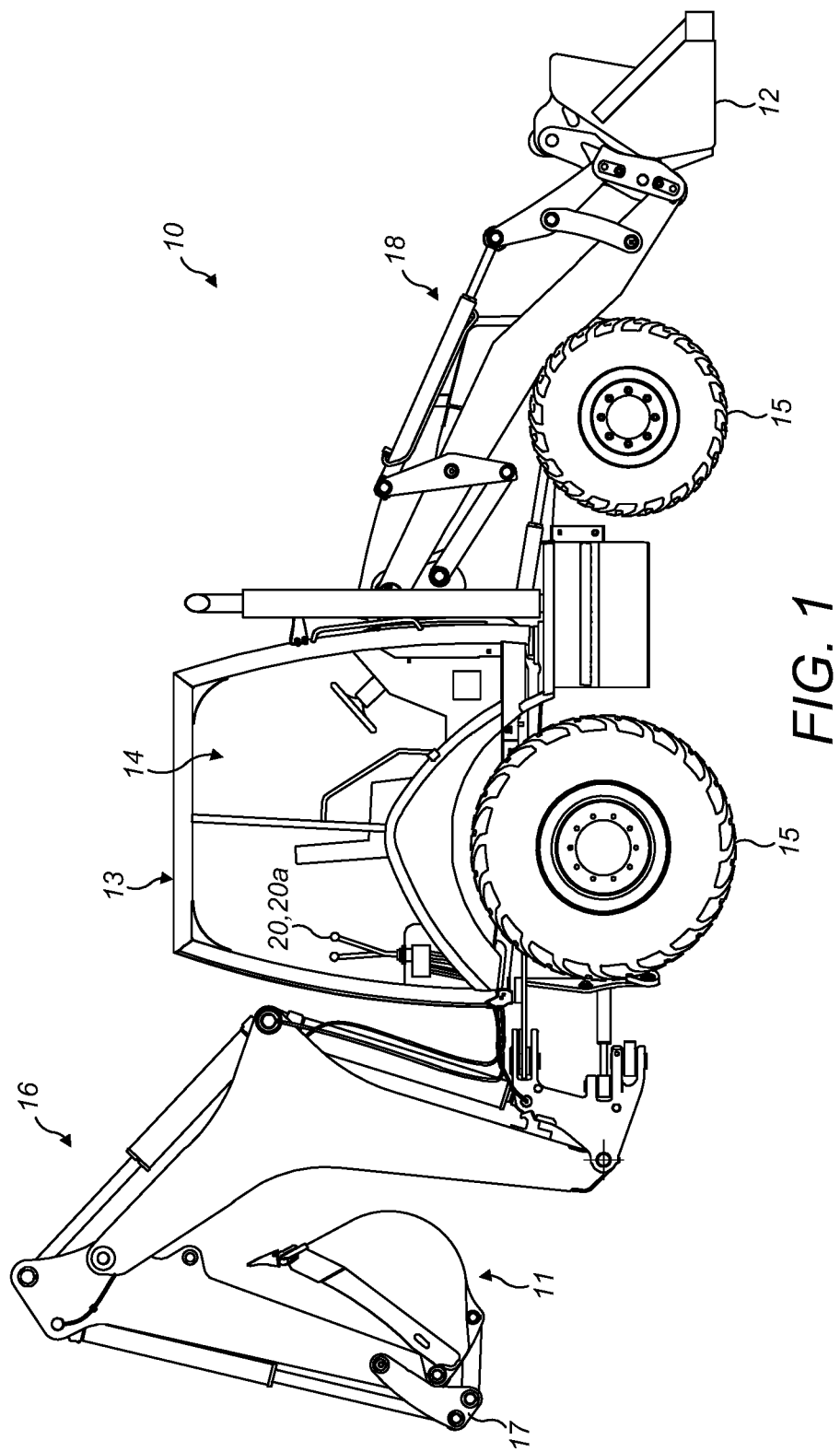
FIG. 1 is a side elevation of a backhoe loader, being a vehicle suitable for implementing the method and control system of the present disclosure.

FIG. 1 illustrates an example of a vehicle 10, in this case a backhoe loader, which is suitable to implement the method and control system of the present disclosure. The vehicle 10 may, however, be another type of vehicle or work machine. The vehicle 10 may comprise a main unit 13 having an operator cabin 14 for an operator and a power unit 19 (not shown in FIG. 1), such as an internal combustion engine, for providing power to ground engaging means 15, such as tracks or wheels. The vehicle 10 may comprise a first implement 11, in this example a bucket, and a first arm arrangement 16 (a backhoe) to which the first implement 11 may be connected via a known coupling arrangement 17. The vehicle 10 may also comprise a second implement 12, in this example also a bucket, attached to the main unit 13 via a second arm arrangement 18. The first and second arm arrangements 16, 18 and the first and second implements 11, 12 may be manoeuvred by means of a suitable hydraulic system as is known in the art. Vehicles 10 suitable for implementing the method of the present disclosure may have any alternate configurations comprising some or no arms, implements and/or attachments depending on the intended use and function of the vehicle 10.

Figure 2:
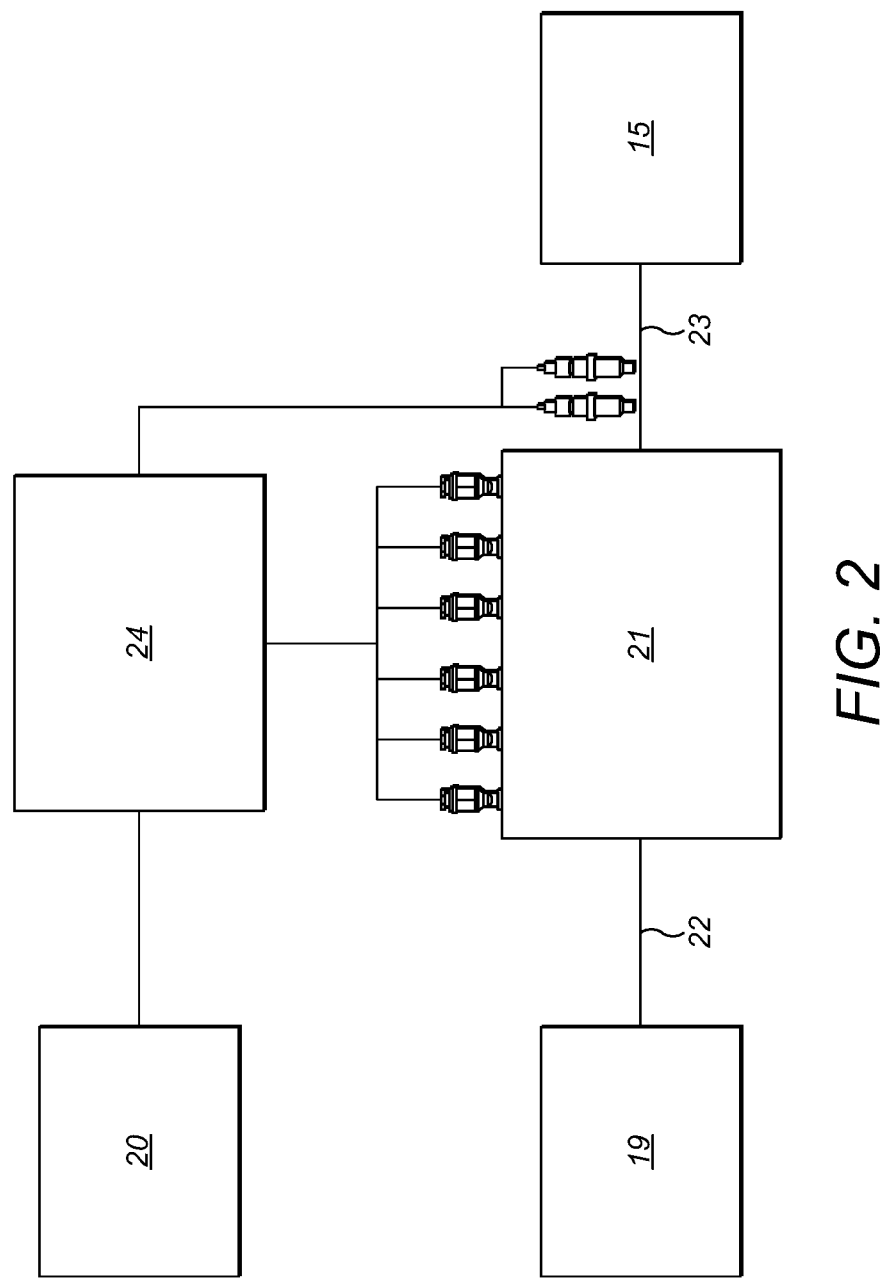
FIG. 2 is a schematic diagram of a power train comprising a transmission control system for implementing the method of the present disclosure.
Figure 3:
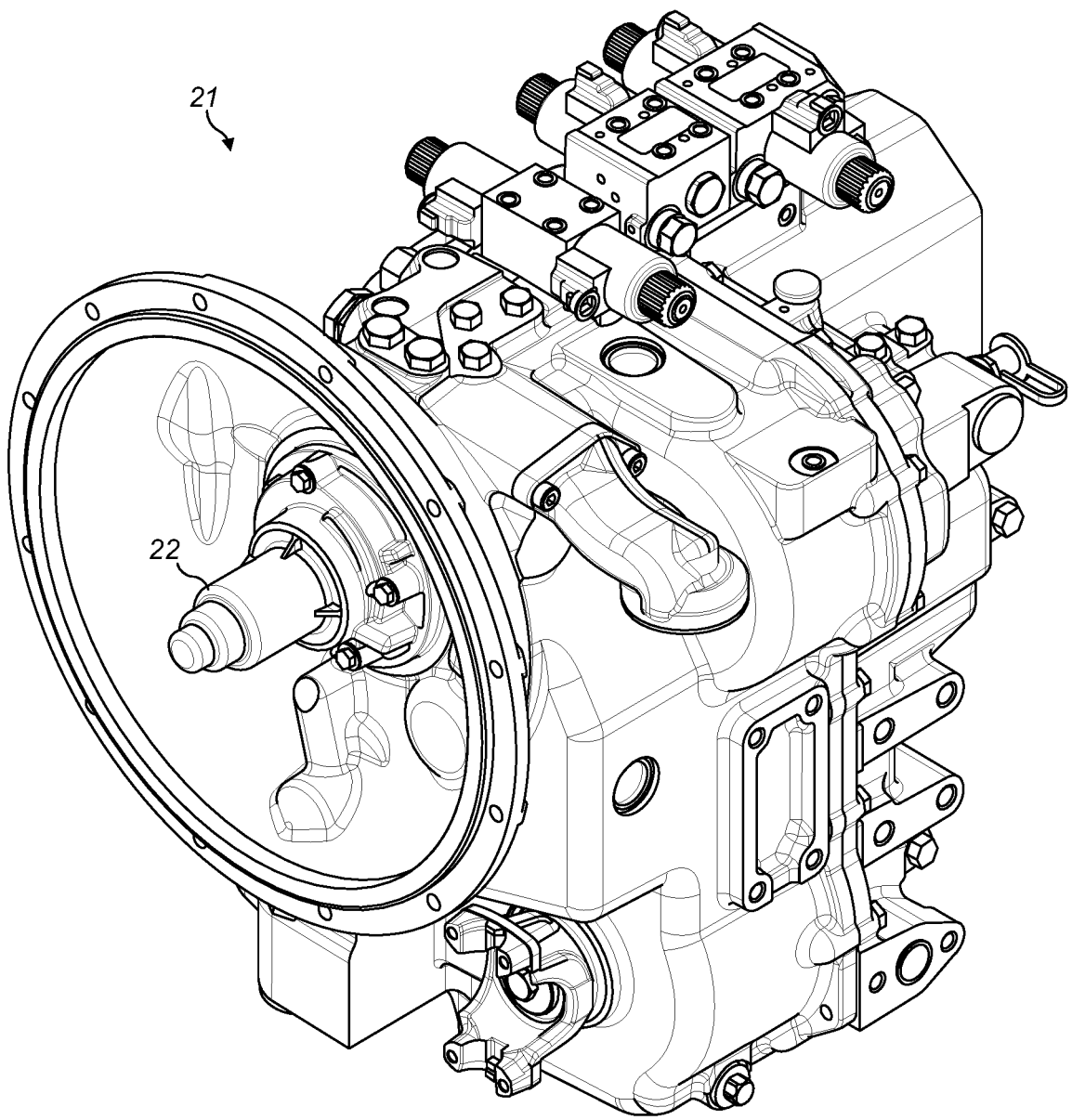
FIG. 3 is pictorial representation of a transmission system for the vehicle of FIG. 1.
Figure 4:
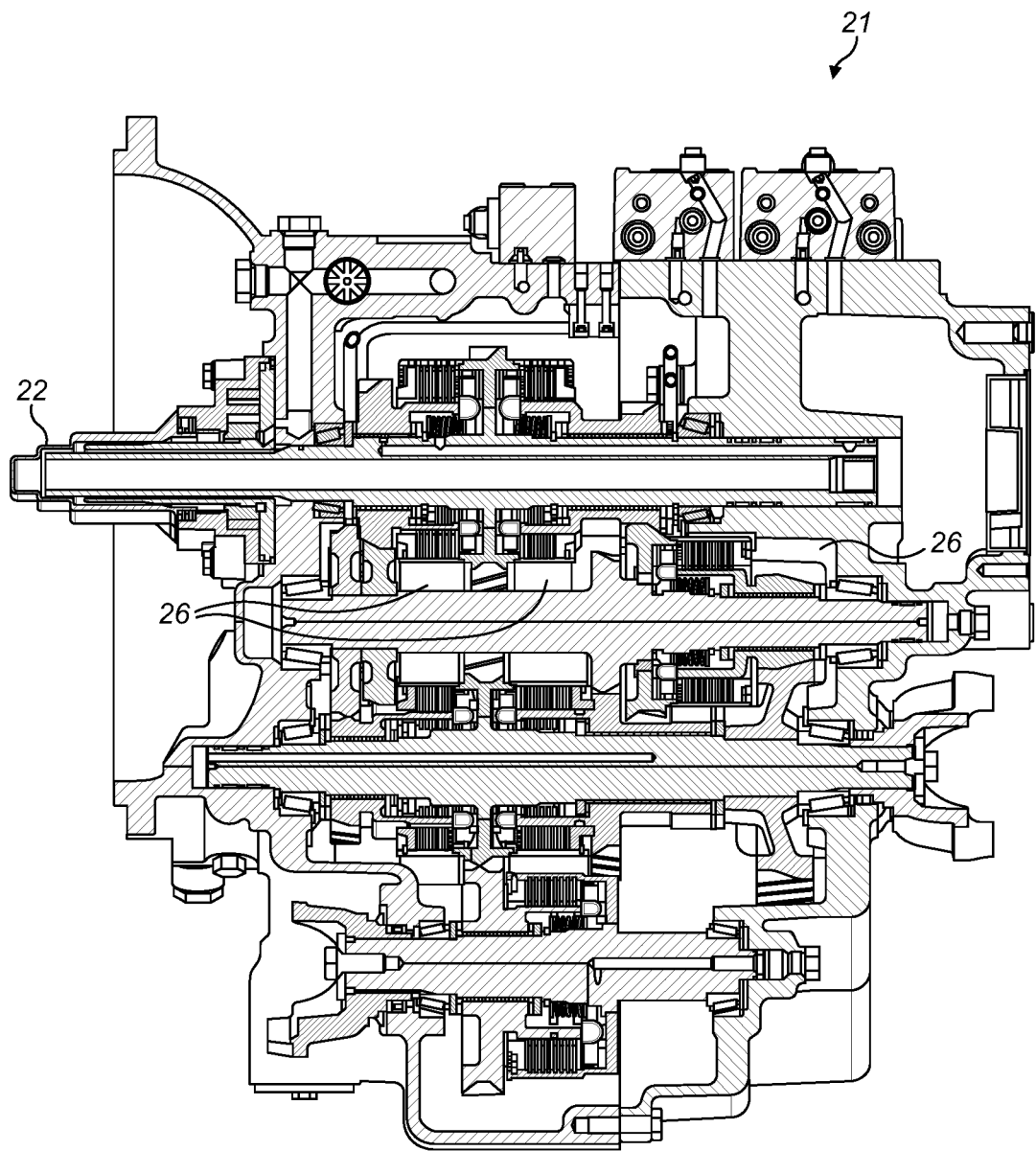
FIG. 4 is a cross section representation of the transmission system of FIG. 3.

The ground engaging means 15 may be powered by an automatic transmission 21 (see FIGS. 2 to 4) operatively connected between the power unit 19 and the ground engaging means 15. A rotating power unit output shaft (not shown) may extend from the power unit 19 and may be connected to a transmission input shaft 22 directly, by a torque converter, or by another indirect drive connection as is known in the art. Alternatively, the transmission 21 may be a direct drive system, which may require the system to be calibrated differently than for an indirect drive system. A transmission output shaft 23 may be connected to the ground engaging means 15 by way of a final drive or the like (not shown). The transmission 21 may be a constant mesh transmission as illustrated, or another type of transmission. As is known in the art, the transmission 21 may comprise a series of gears that are selectively engaged by a combination of clutches 26 and brakes. The clutches 26 may comprise a plurality of speed changing clutches and direction changing clutches. Although not described in detail, combinations of direction and speed changing clutches effectively provide a plurality of transmission gears which control the transmission of power between the power unit 19 and the ground engaging means 15. The transmission gears may be provided to move the vehicle 10 in a first (usually) forward direction and a second (usually reverse) direction. The transmission 21 may therefore have a plurality of first direction transmission gears, which may be forward transmission gears (for example 1F, 2F, 3F, 4F), and second direction transmission gears, which may be reverse transmission gears (for example 1R, 2R, 3R). A suitable shift control 20, such as a joystick or switch arrangement, may be provided in the operator cabin 14 to enable the operator to select a desired direction of travel of the vehicle 10, i.e. forward, neutral or reverse, and thereby acts as an input direction control 31. The input direction control 31 may further comprise a neutralizer control 20a, for example a switch or trigger, may be provided for selecting neutral without moving the shift control 20. The neutralizer control 20a may be provided on the shift control 20 or in any other suitable location. The shift control 20 may also enable the operator to request a gear upshift or downshift, thereby acting as an input gear control 32. The latter function may, however, be provided by a separate device, such as a switch. A suitable input speed control 30, such as a gas pedal or accelerator, may also be provided in the operator cabin 14 to enable the operator to regulate the speed of the vehicle 10. The control device, including the shift control 20 and neutralizer control 20a may generate a direction control signal to the transmission control system 24 indicative of the direction (forward, reverse or neutral), requested by the vehicle operator.

The transmission 21 may be electronically coupled to the transmission control system 24, which may electronically control operation of the transmission 21 at least by controlling the engagement and disengagement of the clutches 26. The clutches 26 may be hydraulically actuated clutches 26, which are disposed in a hydraulic circuit and are each operable to engage in a known manner in response to an actuating flow of pressurised hydraulic fluid thereto. The transmission control system 24 may comprise an on/off clutch control system which, during each gear shift, controls the requisite speed and direction clutches 26. The clutches 26 may be controlled by means of a solenoid valve arrangement comprising a solenoid corresponding to each clutch 26. Actuation of a solenoid, for example on receipt of a suitable control signal thereto, may cause the solenoid to direct an actuating flow of pressurised hydraulic fluid to its respective clutch 26.

In the event of either a requested upshift or downshift in the forward/reverse direction, the on/off control mechanism effects the engagement of the oncoming speed clutch 26, by switching the associated solenoid on, and disengagement of the corresponding off going speed clutch 26, by switching the associated solenoid off. Where a direction shift is selected, the corresponding speed and direction clutch 26 is engaged and disengaged in a similar manner. Such on/off control mechanisms are known in the art. Alternatively, the transmission system may have other types of clutch control, such as electronic clutch pressure control.

Although the physical configuration of the transmission control system 24 is not illustrated, it may comprise a plurality of conventional electronic components, analogue-to-digital converters, input-output devices, solenoid drivers, electronic circuitry, and one or more processors. It is to be understood that the one or more processors may comprise one or more microprocessors, controllers, or any other suitable computing devices, resource, hardware, software, or embedded logic. The transmission control system 24 may comprise memory in the processors, main memory, and/or hard disk drives, which carry a set of non-transient machine readable instructions or software/code which when executed by the one or more processors, causes the transmission control system 24, to operate a gear selection routine 45, 145 in a manner as described herein.

The transmission control system 24 may comprise a plurality of components or modules which correspond to the functional tasks to be performed thereby. In this regard, "module" in the specification will be understood to include an identifiable portion of code, computational or executable instructions, data, or computational object to achieve a particular function, operation, processing, or procedure. It follows that a module need not be implemented in software; a module may be implemented in software, optionally hardware, or a combination of software and hardware. Further, the modules need not necessarily be consolidated into one system, but may be spread across a plurality of other devices and systems to provide the functionality described herein. In one example embodiment, the one or more processors, executing the aforementioned machine readable instructions or software/code, may effectively provide the modules, or the functionality thereof, as described herein.

As an alternative, the transmission control system 24 may be an analog or electromechanical device.

Figure 5:
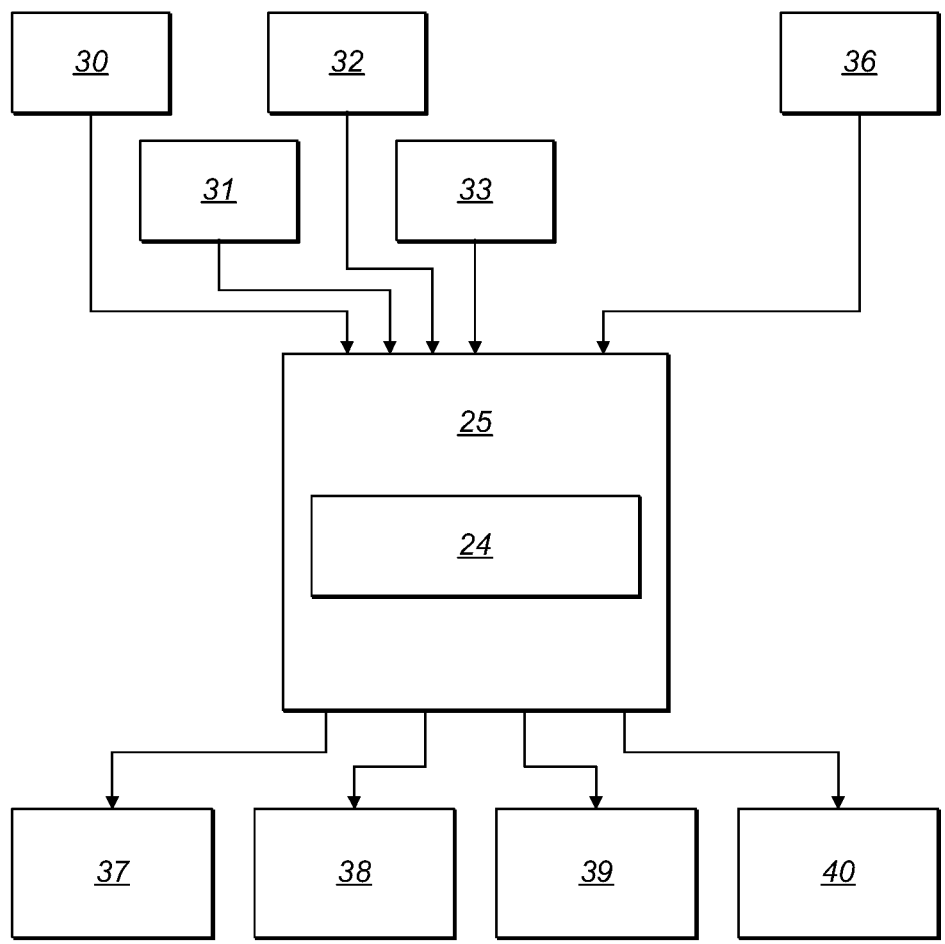
FIG. 5 is a schematic diagram of a machine control system comprising the transmission control system of FIG. 2 and associated control components.

The transmission control system 24 may be part of the main machine control system 25 (as shown in FIG. 5) which controls other functions of the vehicle 10. The machine control system 25 may be of any suitable known type and may comprise an engine control unit (ECU) or the like. The machine control system 25 may comprise a memory, which may store instructions or algorithms in the form of data, and a processing unit, which may be configured to perform operations based upon the instructions. The memory may comprise any suitable computer-accessible or non-transitory storage medium for storing computer program instructions, such as RAM, SDRAM, DDR SDRAM, RDRAM, SRAM, ROM, magnetic media, optical media and the like. The processing unit may comprise any suitable processor capable of executing memory-stored instructions, such as a microprocessor, uniprocessor, a multiprocessor and the like. Alternatively, the transmission control system 24 may be an independent control unit connected electronically to the machine control system 25.

The machine control system 25 may be electronically connected to control elements of the vehicle 10 as well as various input devices, for commanding the operation of the vehicle 10 and monitoring its performance. The machine control system 25 may be connected to a plurality of input devices detecting operator input which provide demand signals to the machine control system 25, that may include:—

- the input speed control 30, which generates a speed control signal;
- the input direction control 31, which generates the direction control signal; and
- the input gear control 32, which generates a gear selection signal.

The machine control system 25 may also be electronically connected to a plurality of sensing devices which provide sensor signals with values indicating real-time operating conditions of the vehicle 10. The sensors may include:—

- at least one transmission output speed sensor 33 connected to the output shaft 23, that transmits a transmission output speed signal and may transmit values indicating the rotational transmission output speed (TOS) of the transmission output shaft 23; and
- an oil temperature sensor 36, such as a thermocouple disposed within the transmission housing or other drivetrain component, that may transmit an oil temperature sensor signal a value corresponding to the oil temperature. Although the control strategy described herein may not make use of oil temperature values, temperature has a notable effect on transmission oil and may prevent or allow certain modes of operation. Thus they may be employed in a modified version of the strategy.

The machine control system 25 may also be electrically connected to output devices to which control signals are transmitted and from which control signals may be received by the machine control system 25. The output devices may include:—

- an engine throttle 37 that may control the speed of the power unit 19;
- one or more clutch actuators 38 that may control the transmission clutches 26 (via the transmission control system 24) to switch between the available gears;
- a brake actuator or actuators 39 that may cause hydraulic fluid to flow to braking devices to engage and reduce the speed of the vehicle 10; and
- other retarding device actuators 40 that may be selectively operated to reduce the TOS. Although the example of the control strategy described herein may not make use of brake and retarding systems, they may be employed in a modified strategy.

Figure 6:
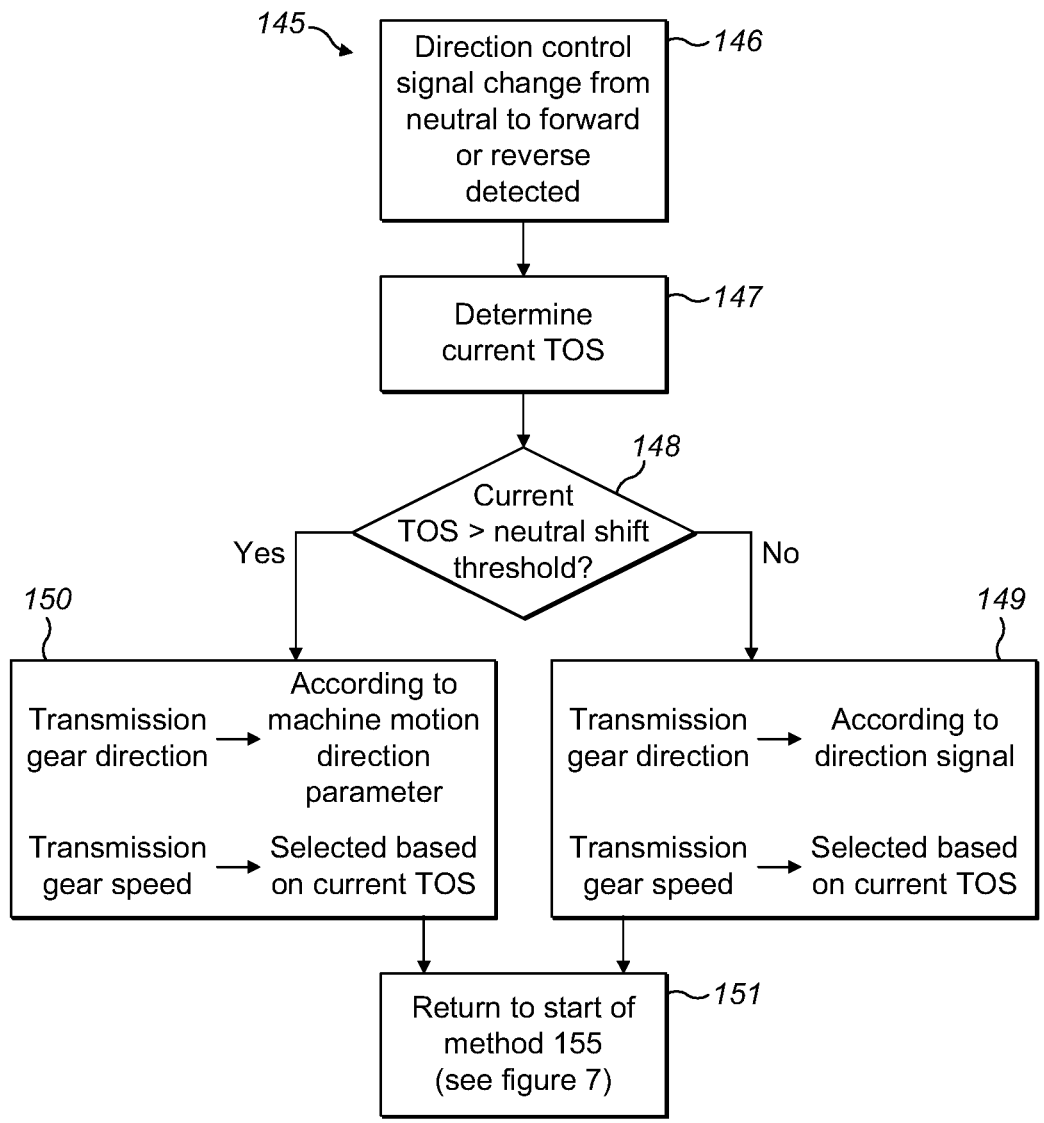
FIG. 6 is a flow diagram illustrating a method according to the present disclosure.
Figure 7:
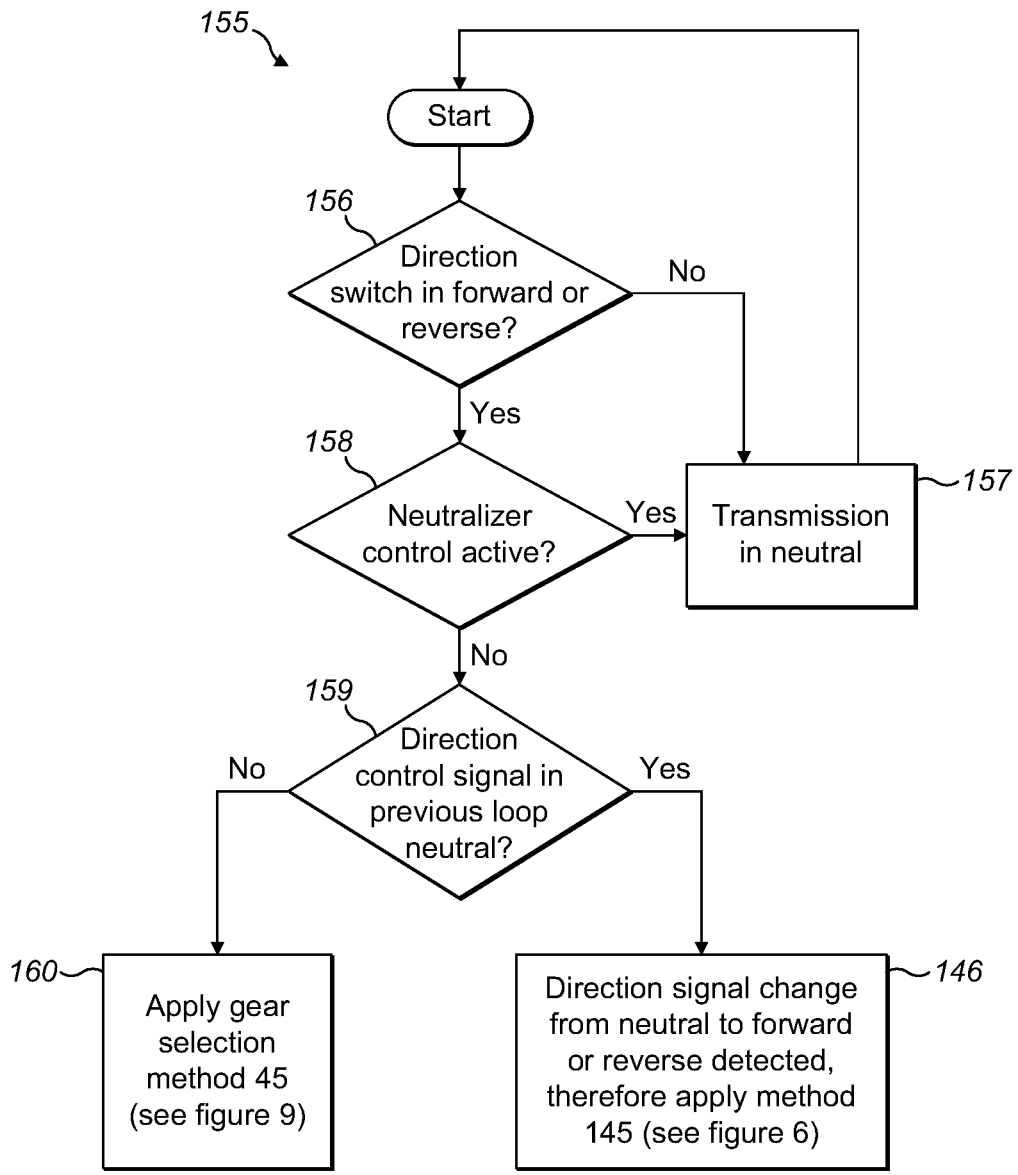
FIG. 7 is a flow diagram illustrating a gear selection routine according to the method of the present disclosure.

Referring to FIG. 6 and FIG. 7, the transmission control system 24 may be programmed to execute a gear selection routine 145 in response to a request by the operator to shift out of neutral, via the input direction control 31. The gear selection routine 145 may comprise a logic which is based on a control strategy designed to prevent engine/transmission damage and assist operator control of the vehicle 10. The logic uses the current TOS, as measured by the transmission output speed sensor 33, and compares this with a predetermined neutral shift threshold TOS programmed into the transmission control system 24. The neutral shift threshold TOS may be the speed below which it is considered safe to allow the transmission to select drive out of neutral in the opposite direction to the direction of travel such that damage is less likely to occur. The logic matches the transmission gear direction to the machine motion direction if the current TOS is over the neutral shift threshold, and matches the selected gear to the current TOS. The logic may therefore inhibit a direction shift if the if the current TOS is over the neutral shift threshold and the machine motion direction parameter does not indicate the same direction as the direction control signal.

The neutral shift threshold TOS for a vehicle 10 may be based on a maximum amount of energy that is expended to shift out of neutral without exceeding an operational limit of a component of the vehicle 10, such as the transmission 21 and the transmission clutches 26. The neutral shift threshold TOS may be pre-programmed into the transmission control system 24. The neutral shift threshold TOS may be empirically derived from test data for the vehicle 10, and may be derived using power and energy analysis to determine the TOS limits which the clutches 26 may take without incurring damage. Different configurations of vehicles 10 and transmissions 21 may have different neutral shift threshold TOS's. The neutral shift threshold TOS may be a fixed value. For example, the neutral shift TOS threshold may be 1000 rpm. The neutral shift threshold TOS for any vehicle may depend on any of a number of parameters, including drive ratio, tyre size, vehicle mass and transmission design.

FIG. 6 illustrates one embodiment of the control logic of the gear selection routine 145 for use in the vehicle 10 described herein according to the method of the present disclosure. The gear selection routine 145 may begin at block 146, when a shift request is made by the operator from neutral to forward or reverse.

If a request to shift out of neutral is determined, by a change in the direction control signal from a neutral signal state to a forward or reverse signal state, control may pass to block 147.

At block 147 the transmission control system 24 may determine the current TOS based on the measurements made by the transmission output speed sensor 33.

At block 148 the transmission control system 24 may compare the current TOS with the neutral shift threshold TOS for the requested shift.

If the current TOS is equal to or less than the neutral shift threshold TOS, control may pass to block 149, where a signal may be generated to the transmission 21 which may cause it to select a gear from the plurality of forward direction gears if the direction control signal was changed to the forward direction control signal state or to select a gear from the plurality of reverse direction gears if the direction control signal was changed to the reverse signal state.

If the current TOS is greater than the neutral shift threshold TOS, control may pass to block 150. At block 150, the gear selection routine 145 may cause the transmission 21 to select a gear from the plurality of forward direction gears if a machine motion direction parameter indicates forward motion or to select a gear from the plurality of reverse gears if the machine motion direction parameter indicates reverse motion.

Figure 8:
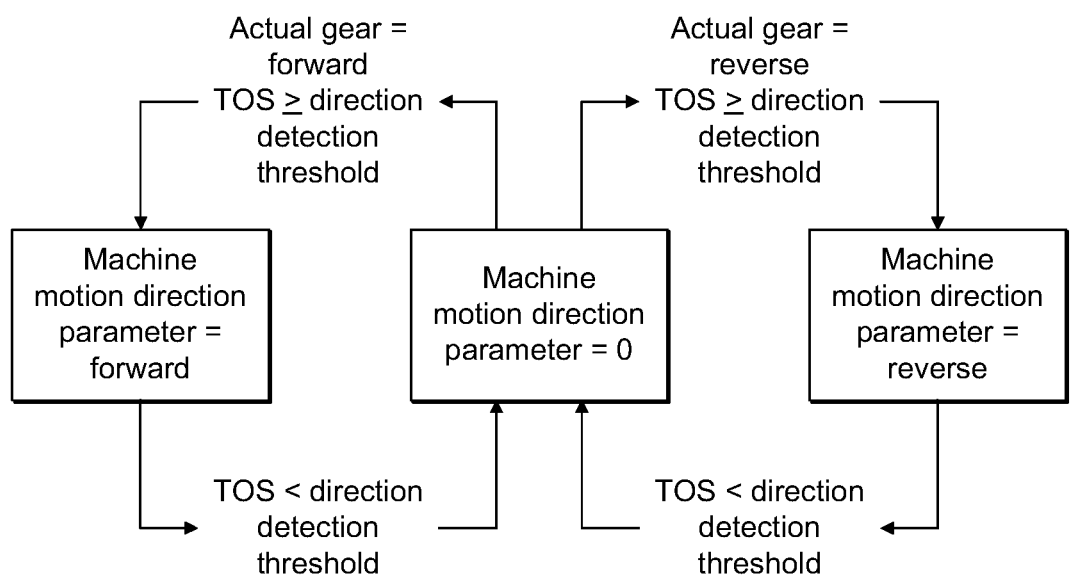
FIG. 8 is a flow diagram illustrating a process for defining a machine motion direction parameter according to the method of the present disclosure.

The machine motion direction parameter may be determined by the transmission control system 24 according to a parameter setting method as illustrated in FIG. 8. When the current transmission output speed is below a direction detection threshold, the machine motion direction parameter is null. The direction detection threshold is a speed above which it can be accurately determined that the machine is moving. When the transmission output speed increases to or above a direction detection threshold, the machine motion direction parameter is set to the forward direction if a gear of the plurality of forward gears is currently engaged or to the reverse direction if a gear of the plurality of reverse gears is currently engaged. The machine motion direction parameter remains fixed until the current transmission output speed passes below the direction detection threshold. Therefore, the machine motion direction parameter does not change directly from forward to reverse and changes only when the transmission output speed passes below the direction detection threshold value.

Alternatively, the machine motion direction parameter may be determined by other suitable means, for example a direction detection sensor attached to the transmission output.

Each gear of the plurality of forward gears and the plurality of reverse gears has a gear selection threshold transmission output speed. In blocks 149 and 150, the specific gear selected from the plurality of forward gears or the plurality of reverse gears is selected by comparison of the current transmission output speed with the gear selection threshold transmission output speeds.

A gear selection threshold TOS may be set for each gear, the gear selection threshold TOS representing a maximum TOS for shifting into that particular gear. This threshold may be based on calculated or sensed speed which can be directly correlated to the power and energy which the transmission must absorb or redirect. This threshold can be stored or calculated in real time.

The gear selected for a particular current TOS may be the lowest gear for which the current TOS is less than or equal to the gear selection threshold TOS. If the current TOS is over the gear selection threshold for the highest gear in a particular direction, the highest gear in that direction may be selected.

As an example, the gear selection threshold TOS's may be as shown in the table below.

| Gear | Gear selection threshold TOS (rpm) |
|---|---|
| 1F (i.e. 1 Forward) | 475 |
| 2F | 1283 |
| 3F | 1644 |
| 4F | 3837 |
| 5F | 3837 |
| 6F | 3837 |
| 1R (i.e. 1 Reverse) | 475 |
| 2R | 1283 |
| 3R | 1644 |

As a further example, the gear selection threshold TOS's may be as shown in the table below.

| Gear | Gear selection threshold TOS (rpm) |
|---|---|
| 1F (i.e. 1 Forward) | 475 |
| 2F | 752 |
| 3F | 982 |
| 4F | 1553 |
| 5F | 2137 |
| 6F | 5000 |
| 1R (i.e. 1 Reverse) | 475 |
| 2R | 752 |
| 3R | 982 |

After the gear is selected in blocks 149 or 150, another gear selection routines or control methods may be used to determine subsequent gear changes. For example, if the operator's selected direction differs from the actual machine direction, then a reduced engine speed may be used to slow the machine to a suitable speed before selecting the operators' requested direction. If the engaged direction matches the operator's requested direction, then other gear shift routines may choose to modify the gear and direction further in response to a change in vehicle speed or the operator's request.

Gear selection routine 145 may therefore form part of a gear control method 155, which is illustrated in FIG. 7. From blocks 149 or 150, control may pass to the start of gear control method 155.

As shown in FIG. 7, the transmission control system 24 may continuously evaluate the value of the direction control signal from the input direction control 31. The gear selection routine 145 may therefore form part of a continuously looping gear control method 155.

The gear control method 155 includes the steps (blocks 156 to 159) by which the direction control signal change from a neutral signal state to forward signal state or a reverse signal state is detected. As shown in FIG. 7, the direction control signal may be in a neutral state if either a shift control 20 is in the neutral position or if a neutralizer switch 20a is activated by the operator. In gear control method 155, the transmission control system 24 detects if the shift control 20 is in a forward position or the reverse position in block 156. If the shift control 20 is not in the forward position or the reverse position (i.e. is in a neutral position), or if the neutralizer switch 20a is depressed, as checked in block 158, the transmission is placed in neutral (in a neutral condition), as shown at block 157, after which the gear control method loop 155 restarts.

At block 159, If the shift control 20 is in the forward position or the reverse position and the neutralizer switch is not depressed, the transmission control system 24 compares the current direction control signal with that detected in the previous loop of method 155.

If the direction control signal was previously neutral, a direction control signal change from neutral to forward or reverse has been identified, see block 146, and gear selection routine 145 may be carried out as shown in FIG. 6.

Figure 9:
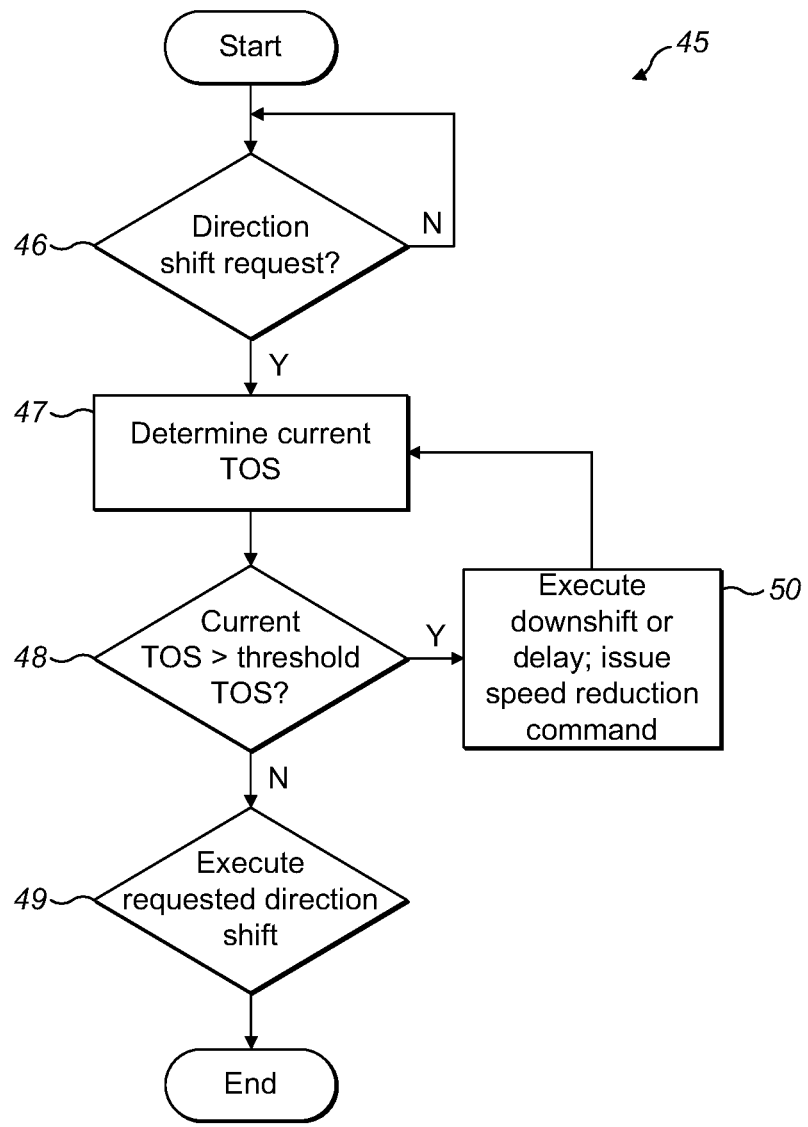
FIG. 9 is a flow diagram illustrating a further gear selection routine according to the method of the present disclosure.

As shown in block 160, if the direction control signal in the previous control loop was in the forward state or the reverse state (i.e. the direction control signal was not neutral), the transmission control system 24 may determine whether a direction shift from forward to reverse (or vice versa) has been requested. If a direction shift has been requested, a further gear selection routine 45 (as shown in FIG. 9 and described below) may be carried out. If a direction shift has not been requested (i.e. the direction control signal in the previous loop and the current loop of the routine is the same), the routine may return to the start of method 155, detecting whether the shift control 20 is in forward or reverse.

References in this description to a position of a shift control 20 and neutralizer switch 20a are given by way of example. The skilled person will understand that the direction input control 31 may take another physical form or may take a form other than device with different physical positions, for example touch screen controls, in which case the "positions" of the controls refer to different states of the control (e.g. a neutral state, a forward state and a reverse state) and "pressing the neutralizer switch" may comprise any form of activation of a neutralizer control.

As shown in FIG. 9, the transmission control system 24 may be programmed to execute a gear selection routine 45 in response to a direction shift requested by the operator via the input direction control 31. The gear selection routine 45 may comprise a logic which is based on a control strategy designed to prevent engine/transmission damage and assist operator control of the vehicle 10. The logic may ensure that the vehicle 10 is moving at an appropriate speed before a direction shift is executed. Thus the gear selection routine 45 may initially inhibit the requested direction shift. Where a requested direction shift is not executed immediately, the gear selection routine 45 may be designed to execute one or more sequential downshifts from the initial gear (i.e. the gear at the time the direction shift is requested) to a secondary gear in the same direction of vehicle travel to assist in the deceleration of the vehicle 10. The gear selection routine 45 may also, under certain conditions, maintain the initial gear and may execute an engine speed reduction command which also assists in the deceleration of the vehicle 10. The direction shift may then only be executed when the vehicle 10 is moving at the appropriate speed and the opposite direction gear selected may be that which matches the current vehicle speed. Thus the same opposite direction gear may be selected as the initial or secondary gear. The logic uses the current TOS, as measured by the transmission output speed sensor 33, and compares this with a predetermined direction shift threshold TOS programmed into the transmission control system 24.

The direction shift threshold TOS for a vehicle 10 may be based on a maximum amount of energy that is expended to change the direction of the vehicle 10 without exceeding an operational limit of a component of the vehicle 10, such as the transmission 21 and the transmission clutches 26. The direction shift threshold TOS may be pre-programmed into the transmission control system 24. The direction shift threshold TOS may be empirically derived from test data for the vehicle 10, and may be derived using power and energy analysis to determine the direction shift TOS limits which the clutches 26 may take without incurring damage. Different configurations of vehicles 10 and transmissions 21 may have different direction shift threshold TOS's.

The machine control system 25 and/or the transmission control system 24 may further be programmed with predetermined downshift inhibit threshold TOS's for each downshift (i.e. to a same direction gear). These may prevent the transmission 21 from downshifting to a lower gear that would risk over speeding of the power unit 19.

FIG. 9 illustrates one embodiment of the control logic of a further gear selection routine 45 for use in the vehicle 10 described herein according to the method of the present disclosure. The gear selection routine 45 may begin at block 46, when a direction shift request is made by the operator from forward to reverse or vice versa. The transmission control system 24 may continuously evaluate the value of the direction control signal from the input direction control 31 and will determine that a direction shift request has been made when the direction control signal value changes from the current travel direction of the vehicle 10 (the first direction) to the opposite direction (the second direction). If a direction shift request is determined, by a change in the direction control signal, control may pass to block 47.

At block 47 the transmission control system 24 may determine the current TOS based on the measurements made by the transmission output speed sensor 33.

At block 48 the transmission control system 24 may compare the current TOS with the direction shift threshold TOS for the requested direction shift.

If the current TOS is equal to or less than the direction shift threshold TOS, control may pass to block 49, where the transmission direction shift signal may be generated to the transmission 21 which may cause it to execute the requested direction shift to same gear in the second direction (known as a straight directional shift). If there is no same gear in the opposite direction (for example if there are 4 forward gears and 3 reverse gears and the direction shift is from 4F) the shift may be made to the next highest gear in the other direction (in the foregoing example to 3R).

If the current TOS is greater than the direction shift threshold TOS, control may pass to block 50. At block 50, the gear selection routine 45 may inhibit the direction shift and may generate one or more transmission downshift signals to the transmission 21 to execute one or more sequential downshifts to a lower gear in the first direction (hereinafter referred to as a secondary gear), or maintain the initial gear, until the current TOS drops to or below the direction shift threshold TOS. A change in gear due to the downshift may cause engine braking to reduce the speed of the vehicle 10 and therefore the TOS. The gear selection routine 45 may alternatively, or in addition, issue an engine speed reduction signal to reduce the engine speed (i.e. the speed of the power unit 19). The machine control system 25 may override the engine throttle 37 on receipt of such an engine speed reduction signal. Where the commanded engine speed is lower than the actual engine speed, the machine control system 25 may limit the supply of fuel to the power unit 19, so that the power unit 19 may be turned by the transmission 21. This means that the transmission 21 may expend energy to turn the power unit 19, which may reduce its speed. The engine speed reduction command may be limited so that there is no positive torque provided by the power unit 19. Retardation may also be provided by pumping losses of the power unit 19 and parasitic loads on the power unit 19 and the vehicle 10. The lower gear (and torque converter characteristics) may act to back drive the power unit 19 to the highest appropriate speed against these losses to maximise the retardation effect. The gear selection routine 45 may select the lowest gear in the first direction which has a downshift inhibit threshold TOS which is greater than the current TOS and may cause the transmission 21 to downshift sequentially to that gear. That gear may then be maintained until the current TOS drops to, or below, the direction shift threshold TOS.

If the initial gear has a downshift inhibit threshold TOS which is greater than the current TOS, the gear selection routine 45 may maintain the initial gear and wait for the current TOS to drop to or below the direction shift threshold TOS generating the transmission direction shift signal.

Control may then pass to block 49 and, if the operator is still requesting the direction shift, i.e. the direction shift request is still active, a transmission direction shift signal may be generated to the transmission 21 which may cause a direction shift to be executed to the same gear in the second direction (or the next highest in the event of there being no corresponding gear in the second direction).

In any aspect of the present disclosure, the neutral shift threshold, which is the threshold applied when shifting out of neutral, may be the same as the predetermined direction shift threshold. Alternatively, the neutral shift threshold and the predetermined direction shift threshold may be different values.

INDUSTRIAL APPLICABILITY

The method of the present disclosure which executes gear selection routine 145 and gear selection method 155 is particularly suitable for a vehicle which uses an on/off clutch control system such as a back hoe loader, although it can be applied to other types of vehicles operating other types of clutch control. The methods of the present disclosure may be effective in limiting transmission damage when shifting into gear out of neutral. The logic used in these methods may inhibit a requested direction change when the transmission output speed is too high and may therefore mitigate degradation and premature failure of the transmission clutches.

According to the present disclosure, a method of controlling gear selection in a vehicle transmission comprises detecting a change in a direction control signal (DCS) from a neutral signal state. If the current TOS is less than or equal to a predetermined neutral shift threshold TOS, the transmission selects one of a plurality of first direction gears if the DCS was changed to a first direction signal state or one of a plurality of second direction gears if the DCS was changed to a second direction signal state. If the current TOS is greater than the predetermined neutral shift threshold TOS, the transmission selects one of the plurality of first direction gears if a machine motion direction parameter indicates that the vehicle is moving in the first direction or one of the plurality of second direction gears if the machine motion direction parameter indicates that the vehicle is moving in the second direction.

The following provides examples of gear selection routine 145 and gear selection method 155 according the present disclosure. In the following examples, the neutral shift transmission output speed threshold may be 1000 rpm. These examples are provided to assist in understanding of the method and control system of the present disclosure and are not to be considered limiting.

In a first example, the machine may be travelling downhill with a transmission output speed of 1800 rpm in the forward direction (such that the machine motion direction parameter is forward) when the operator requests a directional shift, changing the direction control signal from forward, to neutral (momentarily) and then to reverse.

Initially, prior to the request for the directional shift, starting from box 156 of the gear control method, the direction control signal remains in the forward state. The control sequence passes through box 158 (as the neutralizer switch is not pressed) to box 159. As the direction control signal in the previous loop was in the forward state, control passes to box 160, beginning gear selection routine 45. At this point, as a direction shift has not yet been requested, the routine returns to the start of method 155 detecting the position of the shift control 20.

When the shift control 20 is moved momentarily to neutral, the direction control signal changes to the neutral state, and the control system may cause the transmission to be placed in neutral. The routine then returns to the start of method 155, detecting the position of the shift control 20.

When the shift control 20 is moved to reverse, on detecting the position of the shift control 20, the control sequence passes through box 158 to box 159 (because the neutralizer switch is not pressed). As the direction control signal in the previous loop was in the neutral state, a request to shift out of neutral is detected and control passes to box 146, beginning gear selection routine 145.

In this example the current transmission output speed remains over the neutral shift threshold value (1800 rpm vs 1000 rpm). Therefore, the transmission control system 24 selects a forward gear in accordance with the machine motion direction parameter as in box 150. The forward gear selected (e.g. 2F, 3F, 4F) may be matched to a current transmission output speed. The routine may then return to the start of method 155, detecting the position of the shift control 20.

The method then continues through blocks 156, 158 and 159 (in that order). The direction control signal in the previous control loop was not neutral, and so the sequence passes to block 160. At this stage, the operator is requesting the reverse direction via the shift control 20 and the machine is moving forwards with the transmission in a forward gear. Therefore, the transmission control system 24 determines that a direction shift request has been made by the vehicle operator to move the vehicle from the forward to the reverse direction when the transmission is in an initial forward direction gear and applies routine 45. If the current transmission output speed remains over the predetermined direction shift threshold, the control system may slow down the machine, downshift the gears and reduce the transmission output speed, shifting to reverse when the transmission output speed is less than or equal to the predetermined direction shift threshold if operator is still requesting the direction shift.

In an addition to the first example, if the operator of the vehicle presses and releases the neutralizer switch after moving the shift control 20 to reverse, the control system may detect a further change out of neutral. Assuming that the transmission output speed remains over the threshold, the control routine may pass again to box 149 and may follow the remaining routine as described in the first example above.

In a second example, the machine may be travelling on a flat road with a transmission output speed of 1800 rpm in the forward direction (such that the machine motion direction parameter is forward) when the operator presses and releases the neutralizer switch 20a.

Initially, prior to the pressing of the neutralizer switch 20a and starting from box 156 of the gear control method, the direction control signal remains in the forward state. The control sequence passes through box 158 to box 159 (because the neutralizer switch is not pressed). As the direction control signal in the previous loop was in the forward state, control passes to box 160, beginning gear selection routine 45. At this point, as a direction shift has not been requested, the routine may return to the start of method 155, detecting the position of the shift control 20.

When the neutralizer switch 20a is pressed by the operator, the direction control signal may change to the neutral state, and the transmission control system 24 may cause the transmission to be placed in neutral. The routine may then return to the start of method 155, detecting the position of the shift control 20.

When the neutralizer switch 20a is released, on detecting the position of the shift control 20, the control sequence passes through box 158 (as the neutralizer switch is not pressed) to box 159. As the direction control signal in the previous loop was in the neutral state, a request to shift out of neutral is detected and control passes to box 146, beginning gear selection routine 145.

In this example the current transmission output speed remains over the neutral shift threshold value (1800 rpm vs 1000 rpm). Therefore, the transmission control system 24 may select a forward gear in accordance with the machine motion direction parameter as in box 150. The forward gear selected (e.g. 2F, 3F, 4F) may be matched to the current transmission output speed. The machine therefore continues forwards in an appropriate gear for the current transmission output speed. The routine then returns to the start of method 155.

In a third example, the machine may be travelling downhill with a transmission output speed of 700 rpm in the forward direction (such that the machine motion direction parameter is forward) when the operator requests a directional shift, changing the direction control signal from forward, to neutral (momentarily) and then to reverse.

Initially, prior to the request for the directional shift, starting from box 156 of the gear control method, the direction control signal remains in the forward state. The control sequence passes through box 158 to box 159 (because the neutralizer switch is not pressed). As the direction control signal in the previous loop was in the forward state, control passes to box 160, beginning gear selection routine 45. At this point, as a direction shift has not been requested, the routine returns to the start of method 155, detecting the position of the shift control 20.

When the shift control 20 is moved momentarily to neutral, the direction control signal changes to the neutral state, and the control system may cause the transmission to be placed in neutral. The routine then returns to the start of method 155, detecting the position of the shift control 20.

When the shift control 20 is moved to reverse, on detecting the position of the shift control 20, the control sequence passes through box 158 to box 159 (because the neutralizer switch is not pressed). As the direction control signal in the previous loop was in the neutral state, a request to shift out of neutral is detected and control passes to box 146, beginning gear selection routine 145.

In this example the current transmission output speed remains under the neutral shift threshold value (700 rpm vs 1000 rpm). Therefore, the transmission control system 24 selects a reverse gear in accordance with the direction control signal as in box 149. The reverse gear selected (e.g. 2R, 3R, 4R) may be matched to the current transmission output speed. The machine therefore switches into reverse gear as requested by the operator.

The routine then returns to the start of method 155, detecting the position of the shift control 20.

In a fourth example, the machine may be travelling on a flat road with a transmission output speed of 700 rpm in the forward direction (such that the machine motion direction parameter is forward) when the operator presses the neutralizer switch, slows the machine further and releases the neutralizer switch.

Initially, prior to the request for the directional shift, starting from box 156 of the gear control method 155, the direction control signal remains in the forward state. The control sequence passes through box 158 to box 159 (because the neutralizer switch is not pressed). As the direction control signal in the previous loop was in the forward state, control passes to box 160, beginning gear selection routine 45. At this point, as a direction shift has not been requested, the routine returns to the start of method 155, detecting the position of the shift control 20.

When the neutralizer switch 20a is pressed by the operator, the direction control signal may change to the neutral state, and the control system may cause the transmission to be placed in neutral. The routine may then return to the start of method 155, detecting the position of the shift control 20.

When the neutralizer switch 20a is released, on detecting the position of the shift control 20, the control sequence passes through box 158 to box 159 (because the neutralizer switch 20a is not pressed). As the direction control signal in the previous loop was in the neutral state, a request to shift out of neutral is detected and control passes to box 146, beginning gear selection routine 145.

As the current transmission output speed remains under the neutral shift threshold value, the control system selects a forward gear in accordance with the direction control signal as in box 149. The forward gear selected (e.g. 2F, 3F, 4F) may be matched to the current transmission output speed. The machine therefore continues forwards in an appropriate gear for the current transmission output speed. The gear selection routine 145 then returns to the start of method 155.

The method of the present disclosure which executes the gear selection routine 45 is also particularly suitable for a vehicle which uses an on/off clutch control system such as a back hoe loader, although it can be applied to other types of vehicles operating other types of clutch control. This method may be effective in limiting transmission damage as a result of heat energy dissipation to the clutches from high speed directional shifts and may therefore mitigate degradation and premature failure of the transmission clutches. The logic used in the gear selection routine 45 may control the TOS by means of downward shifts in the same direction to slow the vehicle 10 to a speed where a straight direction shift to reverse the direction of travel may not cause transmission damage. The method does not attempt to impose any time constraint on the direction shift, only on the speed. Time based control strategies may suffer from a lack of feedback from the system. By using speed, the strategy may respond faster or slower, depending on the system and may provide better performance and protection.

Examples of the logic steps performed in the gear selection routine 45 as executed by the transmission control system 24 are given in the table of FIG. 10. This will now be described in more detail based on an exemplary transmission 21 having four forward transmission gears 1F, 2F, 3F, 4F and three reverse transmission gears 1R, 2R, 3R and a direction shift threshold TOS of 1000 rpm. The downshift inhibit threshold TOS's for this example may be as shown in the table below.

| Downshift | Downshift inhibit threshold TOS |
| --- | --- |
| 4F-3F | 1345 |
| 3F-2F | 1020 |
| 2F-1F | 717 |
| 2R-1R | 717 |
| 3R-2R | 1345 |

It should be noted that the table shown in FIG. 10 does not refer to 1F or 1R as an initial gear for a direction shift. This may be because, in this embodiment, the current TOS may not reach a damaging speed in these gears. Furthermore 1F or 1R may be avoided in the downshift strategy of the gear selection routine 45 to prevent too much torque passing through the transmission, which may be more torque than expected by the operator. Alternatively the vehicle 10 may be travelling too fast, which may cause damage to 1R/1F if the gear was suddenly reduced. This may be a separate control strategy to prevent the power unit 19 from over speeding.

The control strategies of the present disclosure may be designed to interact with other control strategies which the transmission control system 24 and/or machine control system 25 are programmed to implement.

If the initial gear (i.e. the gear when the direction shift is requested) is 3F and the current TOS is equal to or below the direction shift threshold TOS of 1000 rpm, the gear selection routine 45 may generate a transmission direction shift signal which causes the transmission 21 to immediately execute the direction shift to 3R (i.e. the direction shift is executed to the same gear in the other direction). However, if the current TOS is over 1000 rpm, say 1010 rpm, the gear selection routine 45 may initially inhibit the direction shift (by not generating a generate a transmission direction shift signal)

and may generate a transmission downshift signal to cause the transmission 21 to execute a downshift to the next lowest gear 2F in the same direction (i.e. a secondary gear). The gear selection routine 45 may also generate an engine speed reduction signal to reduce the engine speed. A reduction in engine speed and/or a lower gear may retard the speed of the vehicle 10 and reduce the current TOS. Unfavourable grades, payloads, frictional effects, lack of engine power may be variables which also help the vehicle 10 to slow naturally. When the current TOS falls to or below 1000 rpm, and the operator is still requesting a direction shift, the gear selection routine 45 may generate a transmission direction shift signal to cause the transmission 21 to execute the direction shift to 2R (i.e. the direction shift is executed to the same gear in the second direction).

The gear selection routine 45 may not select 1F as a secondary gear for a further downshift, as the downshift inhibit threshold TOS for a 2F-1F downshift in this example is 717 rpm, which is below the direction shift threshold TOS of 1000 rpm for a 2F-2R direction shift. The same applies in reverse (i.e. selecting 1R). This may apply to each of the following examples.

If the initial gear is 2F and the current TOS is equal to or below the direction shift threshold TOS of 1000 rpm, the gear selection routine 45 may generate a transmission direction shift signal which immediately causes the transmission 21 to execute a direction shift to 2R (i.e. the direction shift is executed to the same gear in the second direction). However, if the current TOS is over the 1000 rpm, the gear selection routine 45 may initially inhibit the direction change by maintaining the initial gear 2F generate an engine speed reduction signal to reduce the engine speed. When the current TOS falls to or below 1000 rpm, the gear selection routine 45 may generate a transmission direction shift signal which causes the transmission 21 to execute the direction shift to 2R (i.e. the direction shift is executed to the same gear in the second direction).

If the initial gear is 4F and the current TOS is equal to or below the direction shift threshold TOS of 1000 rpm, the gear selection routine 45 may generate a transmission direction shift signal to cause the transmission 21 to immediately execute the direction shift to 3R (i.e. the next highest reverse gear as there is no 4R in this example). However, if the current TOS is over 1000 rpm, for example at 1010 rpm, the gear selection routine 45 may initially inhibit the direction shift and may generate a transmission direction shift signal to cause the transmission 21 to execute a first downshift 3F as a first secondary gear in the same direction, then a second downshift to 2F as a second secondary gear. The gear selection routine 45 may also generate an engine speed reduction signal to reduce the engine speed. When the current TOS subsequently falls to or below 1000 rpm, the gear selection routine 45 may generate a transmission direction shift signal to cause the transmission 21 to execute the direction shift to 2R (i.e. the direction shift is executed to the same gear in the second direction).

If the direction shift is requested when the initial gear is 4F and the current TOS, for example 1050 rpm, only a first downshift from 4F-3F may be performed as the current TOS is higher than the downshift threshold TOS for a 3F-2F (i.e. 1020 rpm). 3F may therefore be the secondary gear which will remain selected until the current TOS subsequently falls to or below 1000 rpm, at which point the gear selection routine 45 may generate a transmission direction shift signal to cause the transmission 21 to execute the direction shift to 3R (i.e. the direction shift is executed to the same gear in the other direction). In this case, 2F may or may not be selected when the current TOS is between 1000 rpm and 1020 rpm, depending on calibration.

If the initial gear is 3R and the current TOS is equal to or below the direction shift threshold TOS of 1000 rpm, the gear selection routine 45 may generate a transmission direction shift signal to cause the transmission 21 to execute the direction shift to 3F (i.e. the direction shift is executed to the same gear in the other direction). However, if the current TOS is over 1000 rpm, for example at 1010 rpm, the gear selection routine 45 may initially inhibit the direction shift and may generate a transmission direction shift signal to cause the transmission 21 to execute a downshift to 2R, which is the secondary gear in the same direction. The gear selection routine 45 may also cause generate an engine speed reduction signal to reduce the engine speed. When the current TOS falls to or below 1000 rpm, the gear selection routine 45 may generate a transmission direction shift signal to cause the transmission 21 to execute the direction shift to 2F (i.e. the direction shift is executed to the same gear in the second direction).

If the initial gear is 2R and the current TOS is equal to or below the direction shift threshold TOS of 1000 rpm, the gear selection routine 45 may generate a transmission direction shift signal to cause the transmission 21 to execute the direction shift to 2F (i.e. the direction shift is executed to the same gear in the other direction). However, if the current TOS is over 1000 rpm, the gear selection routine 45 may initially inhibit the direction shift and maintain the initial gear 2R and generate and engine speed reduction signal to reduce the engine speed. When the current TOS falls to or below 1000 rpm, the transmission control system 24 may generate a transmission direction shift signal to cause the transmission 21 to execute the direction shift to 2F (i.e. the direction shift is executed to the same gear in the second direction).

In any aspect of the disclosure, the "current TOS" in a subsequent control loop or method may be an updated current TOS for that loop or method. Similarly, the direction control signal in a subsequent control loop or method may be an updated direction control signal for that loop or method.

In any aspect of the disclosure, the first direction may be one of a forward or reverse direction and a second direction may be the other of the forward or reverse direction.

The invention claimed is:

1. A method of controlling gear selection in a transmission of a vehicle, said vehicle having a power unit and an automatic transmission, said transmission having a plurality of first direction gears configured to move the vehicle in a first direction and a plurality of second direction gears configured to move the vehicle in a second direction which is opposite to the first direction;
wherein a direction control signal is received from one or more input devices controlled by an operator of the vehicle; and
a control system of the vehicle determines a machine motion direction parameter according to a parameter setting method, in which:
when the transmission output speed is below a direction detection threshold, the machine motion direction parameter is set to null; and
when the transmission output speed increases to or above the direction detection threshold, the machine motion direction parameter corresponds to the first direction if a gear of the plurality of first direction gears is currently engaged or to the second direction if a gear of the plurality of second direction gears is currently engaged; and wherein the machine motion direction parameter remains fixed until the transmission output speed passes below the direction detection threshold;

the method comprising the steps of:
i) detecting a change in the direction control signal from a neutral signal state to a first direction signal state or a second direction signal state;
ii) determining a current transmission output speed;
iii) comparing the current transmission output speed with a predetermined neutral shift threshold transmission output speed; and either
iv a) if the current transmission output speed is less than or equal to the predetermined neutral shift threshold transmission output speed, causing the transmission to select a gear from the plurality of first direction gears if the direction control signal was changed to the first direction signal state or to select a gear from the plurality of second direction gears if the direction control signal was changed to the second direction signal state or
iv b) if the current transmission output speed is greater than the predetermined neutral shift threshold transmission output speed, causing the transmission to select a gear from the plurality of first direction gears if the machine motion direction parameter indicates that the vehicle is moving in the first direction or to select a gear from the plurality of second direction gears if the machine motion direction parameter indicates that the vehicle is moving in the second direction.

2. A method as claimed in claim 1 wherein each gear of the plurality of first direction gears and the plurality of second direction gears has a gear selection threshold transmission output speed; and wherein the gear selected from the plurality of first direction gears or the plurality of second direction gears is selected by comparison of the current transmission output speed with the gear selection threshold transmission output speeds.

3. A method as claimed in claim 1 comprising detecting an updated direction control signal after step iv a) or iv b) and either:
if the updated direction control signal is in the neutral signal state, placing the transmission in a neutral condition; or
if the updated direction control signal is in the first direction signal state or the second direction signal state, applying a further gear selection method.

4. A method as claimed in claim 3 wherein the further gear selection method comprises:
determining if a direction shift has been requested by the vehicle operator to move the vehicle from the first direction to the second direction when the transmission is in an initial first direction gear; and, if so,
determining an updated current transmission output speed;
comparing the updated current transmission output speed with a predetermined direction shift threshold transmission output speed; and
if the updated current transmission output speed is less than or equal to the predetermined direction shift threshold transmission output speed, causing the transmission to execute a direction shift from the initial first direction gear to a further selected second direction gear, wherein the further selected second direction gear corresponds to the initial first direction gear or a next highest second direction gear if there is no second direction gear which corresponds to the initial first direction gear, and if the updated current transmission output speed is greater than the predetermined direction shift threshold transmission output speed, inhibiting the direction shift until the updated current transmission output speed slows to less than or equal to the predetermined direction shift threshold transmission output speed.

5. The method as claimed in claim 4 wherein:
if the updated current transmission output speed is greater that the predetermined direction shift threshold transmission output speed, the transmission is caused to execute one or more downshifts from the initial first direction gear to a secondary first direction gear which is the lowest gear which has a predetermined downshift inhibit threshold which is greater than the updated current transmission output speed, each downshift being to the next highest first direction gear sequentially, and when the updated current transmission output speed slows to less than or equal to the predetermined direction shift threshold transmission output speed, and if the direction shift request is still active, the transmission is caused to execute a direction shift from the secondary first direction gear to a further selected secondary second direction gear, wherein the further selected secondary second direction gear corresponds to the secondary first direction gear or a next highest second direction gear if there is no second direction gear which corresponds to the secondary first direction gear.

6. The method as claimed in claim 4 wherein:
if the initial first direction gear is the lowest gear which has a predetermined downshift inhibit threshold which is greater than the updated current transmission output speed, the initial first direction gear is maintained, and when the updated current transmission output speed slows to less than or equal to the predetermined direction shift threshold transmission output speed, and if the direction shift request is still active, the transmission is caused to execute a direction shift from the initial first direction gear to the further selected second direction gear.

7. The method as claimed in claim 1, comprising the further step of executing an engine speed reduction signal to reduce a speed of the power unit.

8. A method as claimed in claim 1 wherein the direction detection threshold corresponds to a transmission output speed above which machine movement is capable of being detected.

9. A control system for controlling gear selection in a transmission of a vehicle, said vehicle having a power unit and an indirect drive automatic transmission, said transmission having a plurality of first direction gears configured to move the vehicle in a first direction and a plurality of second direction gears configured to move the vehicle in a second direction which is opposite to the first direction, said control system configured to;
evaluate a direction control signal from one or more input devices controlled by an operator of the vehicle; and
determine a machine motion direction parameter according to a parameter setting method, in which:
when the transmission output speed is below a direction detection threshold, the machine motion direction parameter is set to null; and when the transmission output speed increases to or above the direction detection threshold, the machine motion direction parameter corresponds to the first direction if a gear of the plurality of first direction gears is currently engaged or to the second direction if a gear of the plurality of second direction gears is currently engaged; and wherein the machine motion direction parameter remains fixed until the transmission output speed passes below the direction detection threshold;

i) said control system being further configured to detect a change in the direction control signal from a neutral signal state to a first direction signal state or a second direction signal state;

ii) determine a current transmission output speed;

iii) compare the current transmission output speed with a predetermined neutral shift threshold transmission output speed; and either iv a) if the current transmission output speed is less than or equal to the predetermined neutral shift threshold transmission output speed, cause the transmission to select a gear from the plurality of first direction gears if the direction control signal was changed to the first direction signal state or to select a gear from the plurality of second direction gears if the direction control signal was changed to the second direction signal state; or iv b) if the current transmission output speed is greater than the predetermined neutral shift threshold transmission output speed, cause the transmission to select a gear from the plurality of first direction gears if the machine motion direction parameter indicates that the vehicle is moving in the first direction or to select a gear from the plurality of second direction gears if the machine motion direction parameter indicates that the vehicle is moving in the second direction.

10. A control system as claimed in claim 9 wherein each gear of the plurality of first direction gears or the plurality of second direction gears has a gear selection threshold transmission output speed; and wherein the gear selected from the plurality of first direction gears and the plurality of second direction gears is selected by comparison of the current transmission output speed with the gear selection threshold transmission output speeds.

11. A control system as claimed in claim 9 further configured to detect an updated direction control signal after step iv a) or iv b) and either:

if the updated direction control signal is in the neutral signal state, causing the transmission to be placed in a neutral condition; or if the updated direction control signal is in the first direction signal state or the second direction signal state, apply a further gear selection method.

12. A control system as claimed in claim 11, wherein during the further gear selection method, the control system is configured to:

evaluate direction control signals to determine if a direction shift request has been made by the vehicle operator to move the vehicle from the first to the second direction when the transmission is in an initial first direction gear; and, if so, determine an updated current transmission output speed;

compare the updated current transmission output speed with a predetermined direction shift threshold transmission output speed; and if the updated current transmission output speed is less than or equal to the predetermined direction shift threshold transmission output speed, generate a transmission direction shift signal to cause the transmission to execute a direction shift from the initial first direction gear to a further selected second direction gear, wherein the further selected second direction gear corresponds to the initial first direction gear or a next highest second direction gear if there is no second direction gear which corresponds to the initial first direction gear, and if the updated current transmission output speed is greater than the predetermined direction shift threshold transmission output speed, inhibit the direction shift until the updated current transmission output speed slows to less than or equal to the predetermined direction shift threshold transmission output speed.

13. The control system as claimed in claim 12, wherein:

if the updated current transmission output speed is greater that the predetermined direction shift threshold transmission output speed, the control system is further configured to generate a downshift signal to cause the transmission to execute one or more downshifts from the initial first direction gear to a secondary first direction gear which is the lowest gear which has a predetermined downshift inhibit threshold which is greater than the updated current transmission output speed, each downshift being to the next highest first direction gear sequentially, and when the updated current transmission output speed slows to less than or equal to the predetermined direction shift threshold transmission output speed, and if the direction shift request is still active, to generate a direction shift signal which causes the transmission to execute a direction shift from the secondary first direction gear to a further selected secondary second direction gear, wherein the further selected secondary second direction gear corresponds to the secondary first direction gear or a next highest second direction gear if there is no second direction gear which corresponds to the secondary first direction gear.

14. The control system as claimed in claim 12, wherein:

if the initial first direction gear is the lowest gear which has a predetermined downshift inhibit threshold which is greater than the updated current transmission output speed, the control system is configured to maintain the initial first direction gear, and when the updated current transmission output speed slows to less than or equal to the predetermined direction shift threshold transmission output speed, and if the direction shift request is still active, generate a direction shift signal which causes the transmission to execute a direction shift from the initial first direction gear to the further selected second direction gear.

15. The control system as claimed in claim 12, wherein the control system is configured to generate an engine speed reduction signal.

16. The control system as claimed in claim 9 wherein the direction detection threshold corresponds to a transmission output speed above which machine movement is capable of being detected.

17. A vehicle comprising:

a power unit;

an indirect drive automatic transmission, said transmission having a plurality of first direction gears configured to move the vehicle in a first direction and a plurality of second direction gears configured to move the vehicle in a second direction which is opposite to the first direction;

an operator actuated input direction control configured to generate direction control signals;

at least one transmission output speed sensor configured to measure current speed of the transmission output and generate a transmission output speed signal; and the control system as claimed in claim 9 operatively connected to the power unit, transmission, input direction control, and at least one transmission output speed sensor.

* * * * *